United States Patent [19]

Kawashima

[11] Patent Number: 5,139,572
[45] Date of Patent: Aug. 18, 1992

[54] REUSABLE HIDDEN INDICIA PRINTED SHEET

[76] Inventor: Kiyoharu Kawashima, 5-7 Esaka-cho, 5-chome, Suita-shi, Osaka-fu, Japan

[21] Appl. No.: 533,773

[22] Filed: Jun. 6, 1990

[30] Foreign Application Priority Data

Jun. 20, 1989 [JP] Japan .................................. 1-158998

[51] Int. Cl.$^5$ ..................... C09D 11/00; B42D 15/00
[52] U.S. Cl. ...................................... 106/21; 283/72; 283/95; 283/901
[58] Field of Search ....................... 106/21; 283/72, 95, 283/901

[56] References Cited

U.S. PATENT DOCUMENTS

| | | | |
|---|---|---|---|
| 1,884,197 | 10/1932 | Peterson et al. | 283/95 |
| 2,618,866 | 11/1952 | Adams | 283/95 |
| 3,632,364 | 1/1972 | Thomas et al. | 106/21 |
| 3,850,649 | 11/1974 | Buerkley et al. | 106/21 |
| 3,979,550 | 9/1976 | Panken | 106/21 |
| 4,111,702 | 9/1978 | Fraik | 106/21 |
| 4,188,431 | 2/1980 | Sokol et al. | 106/21 |
| 4,322,466 | 3/1982 | Tomlinson | 106/21 |

FOREIGN PATENT DOCUMENTS 179572 10/1984 Japan ..................................... 106/21

Primary Examiner—William R. Dixon, Jr.
Assistant Examiner—Helene Klemanski
Attorney, Agent, or Firm—Stevens, Davis, Miller & Mosher

[57] ABSTRACT

A print of this invention has a color-forming area and a discoloring area. The color-forming area is printed by an ink containing a first color-changing agent which changes from substantially invisible colorlessness to visibleness by applying a color former. The discoloring area is printed by an ink containing a second color-changing agent which changes a from substantially invisible colorlessness to visibleness by applying the color former and returns to invisible colorlessness state as the time passes naturally after changing its color.

6 Claims, 5 Drawing Sheets

LESSON 2    FOLLOW SIGNALS

SIGNALS

| ANSWER COLUMN | CORRECT ANSWER | | |
|---|---|---|---|
| ☒ | ☒ | ① | EVENT WHEN THE RIGHT AND LEFT SIGNALS ARE RED OR YELLOW, THE SIGNAL IN FRONT IS NOT ALWAYS BLUE. |
| ☒ | ☒ | ② | WHENEVER THE FRONT SIGNAL SHOWS "BLUE", YOU MUST START THE CAR. |
| ☒ | ☒ | ③ | CARS (EXCEPT THOSE HAVING SMALLER DISPLACEMENTS) MAY TO STRAIGHT FORWARD OR TURN TO THE LEFT, BUT MUST NOT TURN TO THE RIGHT WHEN THE FRONT SIGNAL IS BLUE. |
| ☒ | ☒ | ④ | WHEN THE SIGNAL IS A BLUE LIGHT, CARS AND SMALL MOTORBIKES MAY GO STRAIGHT FORWARD, OR TURN TO THE RIGHT OR THE LEFT. |
| ☒ | ☒ | ⑤ | AS THE BLUE SIGNAL LIGHT MEANS "GO", YOU CAN START THE CAR REGARDLESS OF THE ROAD CONDITIONS. |
| ☒ | ☒ | ⑥ | CARS FACING THE YELLOW SIGNAL LIGHT MUST NOT GO BEYOND THE STOP LINE IN PRINCIPLE. |
| ☒ | ☒ | ⑦ | ALTHOUGH THE FRONT SIGNAL CHANGED TO YELLOW, AS YOU CAN NOT STOP EXCEPT A SUDDEN BRAKING, YOU PROCEEDED WITHOUT STOPPING THERE. |

FIG.1

LESSON 2    FOLLOW SIGNALS

| ANSWER COLUMN | CORRECT ANSWER | SIGNALS |
|---|---|---|
| ○ | — | ① EVENT WHEN THE RIGHT AND LEFT SIGNALS ARE RED OR YELLOW, THE SIGNAL IN FRONT IS NOT ALWAYS BLUE. |
| ✗ | — | ② WHENEVER THE FRONT SIGNAL SHOWS "BLUE", YOU MUST START THE CAR. |
| ○ | — | ③ CARS (EXCEPT THOSE HAVING SMALLER DISPLACEMENTS) MAY TO STRAIGHT FORWARD OR TURN TO THE LEFT, BUT MUST NOT TURN TO THE RIGHT WHEN THE FRONT SIGNAL IS BLUE. |
| ○ | — | ④ WHEN THE SIGNAL IS A BLUE LIGHT, CARS AND SMALL MOTORBIKES MAY GO STRAIGHT FORWARD, OR TURN TO THE RIGHT OR THE LEFT. |
| ✗ | — | ⑤ AS THE BLUE SIGNAL LIGHT MEANS "GO", YOU CAN START THE CAR REGARDLESS OF THE ROAD CONDITIONS. |
| ○ | — | ⑥ CARS FACING THE YELLOW SIGNAL LIGHT MUST NOT GO BEYOND THE STOP LINE IN PRINCIPLE. |
| ✗ | — | ⑦ ALTHOUGH THE FRONT SIGNAL CHANGED TO YELLOW, AS YOU CAN NOT STOP EXCEPT A SUDDEN BRAKING, YOU PROCEEDED WITHOUT STOPPING THERE. |

FIG.2(a)

LESSON 2 FOLLOW SIGNALS

| ANSWER COLUMN | CORRECT ANSWER | | SIGNALS |
|---|---|---|---|
| ☐○ | ○ | 1 | EVENT WHEN THE RIGHT AND LEFT SIGNALS ARE RED OR YELLOW, THE SIGNAL IN FRONT IS NOT ALWAYS BLUE. |
| ☒ | ✗ | 2 | WHENEVER THE FRONT SIGNAL SHOWS "BLUE", YOU MUST START THE CAR. |
| ☒ | ✗ | 3 | CARS (EXCEPT THOSE HAVING SMALLER DISPLACEMENTS) MAY TO STRAIGHT FORWARD OR TURN TO THE LEFT, BUT MUST NOT TURN TO THE RIGHT WHEN THE FRONT SIGNAL IS BLUE. |
| ☐○ | ○ | 4 | WHEN THE SIGNAL IS A BLUE LIGHT, CARS AND SMALL MOTORBIKES MAY GO STRAIGHT FORWARD, OR TURN TO THE RIGHT OR THE LEFT. |
| ☒ | ✗ | 5 | AS THE BLUE SIGNAL LIGHT MEANS "GO", YOU CAN START THE CAR REGARDLESS OF THE ROAD CONDITIONS. |
| ☐○ | ○ | 6 | CARS FACING THE YELLOW SIGNAL LIGHT MUST NOT GO BEYOND THE STOP LINE IN PRINCIPLE. |
| ☐○ | ○ | 7 | ALTHOUGH THE FRONT SIGNAL CHANGED TO YELLOW, AS YOU CAN NOT STOP EXCEPT A SUDDEN BRAKING, YOU PROCEEDED WITHOUT STOPPING THERE. |

FIG.2(b)

LESSON 2 FOLLOW SIGNALS

| ANSWER COLUMN | CORRECT ANSWER | SIGNALS |
|---|---|---|
| ◻o | o ① 14 | EVENT WHEN THE RIGHT AND LEFT SIGNALS ARE RED OR YELLOW, THE SIGNAL IN FRONT IS NOT ALWAYS BLUE. |
| ⊠ | × ② 14 | WHENEVER THE FRONT SIGNAL SHOWS "BLUE", YOU MUST START THE CAR. |
| 12 ◻o  | 13 ×⁄ ③ 14 4 | CARS (EXCEPT THOSE HAVING SMALLER DISPLACEMENTS) MAY TO STRAIGHT FORWARD OR TURN TO THE LEFT, BUT MUST NOT TURN TO THE RIGHT WHEN THE FRONT SIGNAL IS BLUE. |
| ◻o | o ④ | WHEN THE SIGNAL IS A BLUE LIGHT, CARS AND SMALL MOTORBIKES MAY GO STRAIGHT FORWARD, OR TURN TO THE RIGHT OR THE LEFT. |
| ⊠ | × ⑤ | AS THE BLUE SIGNAL LIGHT MEANS "GO", YOU CAN START THE CAR REGARDLESS OF THE ROAD CONDITIONS. |
| 12 ◻o  | o ⑥ 13 14 4 | CARS FACING THE YELLOW SIGNAL LIGHT MUST NOT GO BEYOND THE STOP LINE IN PRINCIPLE. |
| 12 ⊠  | o ⑦ 13 14 4 | ALTHOUGH THE FRONT SIGNAL CHANGED TO YELLOW, AS YOU CAN NOT STOP EXCEPT A SUDDEN BRAKING, YOU PROCEEDED WITHOUT STOPPING THERE. |

FIG.3

LESSON 2   FOLLOW SIGNALS

| ANSWER COLUMN | CORRECT ANSWER | | SIGNALS |
|---|---|---|---|
| ☐ | — | ① | EVENT WHEN THE RIGHT AND LEFT SIGNALS ARE RED OR YELLOW, THE SIGNAL IN FRONT IS NOT ALWAYS BLUE. |
| ☐ | — | ② | WHENEVER THE FRONT SIGNAL SHOWS "BLUE", YOU MUST START THE CAR. |
| 12 ☐ | 13 | ③ 14 4 | CARS (EXCEPT THOSE HAVING SMALLER DISPLACEMENTS) MAY TO STRAIGHT FORWARD OR TURN TO THE LEFT, BUT MUST NOT TURN TO THE RIGHT WHEN THE FRONT SIGNAL IS BLUE. |
| ☐ | — | ④ | WHEN THE SIGNAL IS A BLUE LIGHT, CARS AND SMALL MOTORBIKES MAY GO STRAIGHT FORWARD, OR TURN TO THE RIGHT OR THE LEFT. |
| ☐ | — | ⑤ | AS THE BLUE SIGNAL LIGHT MEANS "GO", YOU CAN START THE CAR REGARDLESS OF THE ROAD CONDITIONS. |
| ☐ | — | ⑥ | CARS FACING THE YELLOW SIGNAL LIGHT MUST NOT GO BEYOND THE STOP LINE IN PRINCIPLE. |
| 12 ☐ | 13 | ⑦ 14 4 | ALTHOUGH THE FRONT SIGNAL CHANGED TO YELLOW, AS YOU CAN NOT STOP EXCEPT A SUDDEN BRAKING, YOU PROCEEDED WITHOUT STOPPING THERE. |

FIG.4

REUSABLE HIDDEN INDICIA PRINTED SHEET

The present invention relates to a print which allows an effective education in repetition and can improve educational efficiency by comprising a color-forming area printed by using an ink which changes to a visible color by applying a color former and a discoloring area which changes to colorlessness after changing color by aforementioned means.

Conventionally known are so-called "hidden letters" and "hidden pictures" in which letters, pictures and the like are printed in colorlessness by using an ink containing a color-changing agent on a sheet of paper and by applying a color former which reacts to the color-changing agent, so that they are changed from colorlessness to visible colors. Such prints that can be used in repetition are also present which returns to a colorless state again after the color-changing by appropriately selecting the color-changing agent and color former. Such prints where color-changing and discoloring can be realized in reptition are used for educational sheets of paper to train and improve the memorizing and judging abilities, which are coming to be popular.

However, in reviewing all pages of the educational sheets, as those which have already been understood have to be studied again, the learning efficiency comes to be lower and it tends to cause weariness.

Therefore, in order to improve the learning efficiency, it is more preferable to concentrate upon and review items insufficiently understood or points misunderstood than to review all sheets in repetition, and therefore a presentation of such educational sheet has been expected.

It is hence a primary object of the invention to present a print which can satisfy the requirements by allowing concentrated reviewing studies and improving learning efficiency, basically by comprising a color-forming area which maintains a visible color-change and a discoloring area which returns to colorlessness as the time passes after changing into a visible color.

According to one aspect of the present invention, a print comprises a color-forming area printed by using an ink containing a first color-changing agent which continuously changes from substantially invisible colorlessness to visibleness by applying a color former and a discoloring area printed by using an ink containing a second color-changing agent which changes from substantially invisible colorlessness to visibleness by applying the color former and returns to colorless state as the time passes after changing its color.

As colors are changed by applying a color former without using a heating device or the like, its operation is safe. A discoloring area discolors in an hour after the color is developed, the color development can be performed in repetition to show letters and pictures repeatedly, and therefore in an educational sheet or paper, a concentrated reviewing study comes to be possible and the print can be effectively utilized.

In addition, since a color-forming area maintains its color-change for at least twenty-four hours, in the case that a color-forming area is employed in an educational sheet of paper, parts already learned in completion and those required to be learned again can be clearly distinguished to allow an effective study.

An embodiment of the present invention will now be described by way of example, referring to attached drawings, in which;

FIG. 1 is a front view showing one of the embodiments of the inventon; FIGS. 2a and b are front views showing the state of discoloring area in reaction; FIG. 3 is a front view showing the state of both discoloring and color-forming areas in raction; and FIG. 4 is a front view showing the time-course changing state of the print in FIG. 3.

In the figure, a print 1 of the invention comprises a color-formin area 4 printed by using an ink containing a first color-changing agent which continuously changes from colorlessness to a visible color by applying a color former on a sheet of paper 2 and a discoloring area 3 printed by using an ink containing a second color-changing agent which changes colors from colorlessness by applying the color former but returns to colorlessness as the time passes after the color-change. In addition to the color-forming area 4 and the discoloring area 3 in the sheet of paper 2, an unchanging area 5 which is visible and does not change in colors is also employed in the embodiment by using a general printing ink.

In the sheet of paper 2, as shown in FIG. 1, a question column 11 on the right side of the sheet of paper 2, an answer column 12 on the left side of the sheet comprising square frames in which a learner fills with his or her answers to the questions in the columns 11 by marks o, x or the like, a correct answer column 13 in which correct answers to the question column 11 are printed and a judgement clumn 14 comprising ①, ②... between the correct answer column 13 and the question column 11 are employed in the embodiment.

In the square frames of the answer column 12, the insides of the frames are completely printed in colorlessness by using the ink containing the second color-changing agent homogeneously, and in the correct answer column 13, the correct answers are shown by marks such as o and x by using the ink containing the second color-changing agent as the ink used in printing inside the answer column. Therefore, the answer column 12 and the correct answer column 13 form the discoloring area 3.

In the judgment column 14, the insides of the circular frames ①, ②... which show the items of the question column 11, for example, are printed in colorlessness by using the ink containing the first color-changing agent to form the color-forming area 4.

The question column 11 is the visible unchanging part 5 where a general ink is used.

The color-changing agents and color former used in the embodiment are described in detail below.

The color-changing agents and color former used in the embodiment are described in detail below.

As the first color-changing agent and the second color-changing agent herein, a pH indicator having a colorless pH range can be used. As such pH indicators, there are γ-dinitrophenol, m-nitrophenol, o-nitrophenol, p-nitrophenol, cyanine, α-naphtholphthalein, phenolphthalein, cresolphthalein, thymolphthalein, ethylbis-acetic acid, bromphenol purple, hexamethoxy red, heptamethoxy red and the like, which can be used depending on colors to be developed. It is also possible to use one or plural types in combination.

As color former having alkaline pH within a range of pH 7 to 14 of acid, alkali or neutral compounds or the solutions which can regulate pH values, there are ammonia monoethanolamine, 3-ethoxypropylamine, diisobutylamine, secbutylamine, isopropanolamine, ethanolamines, 2-ethylhexylamine, ethyleneamines and the like. As color formers having acidic pH value within a range of pH 1 to 7, there are, for example, acetic acid and formic acid.

In the invention, in order to obtain a clear color-change and to prevent discoloring, it is preferable to use polyhydric alcohols such as ethylene glycol, propylene glycol, polyethylene glycol and glycerine with the color-changing agent or color-generating agent in an aqueous solution of approximately 5 to 50 weight %.

The type and concentration of color former is determined according to the pH value at which the color-changing agent develops its color. In color formers which develop color in a pH range close to neutrality such as nitrophenols, the ph value of the color-reactor ink vehicles is regulated at a lower value beforehand by a nonvolatile pH regulator such as sulfuric acid, tartaric acid and citric acid. This helps to prevent discoloring after printing.

The color-changing agent is prepared as an ink and generally regulated in colorless state. It can also be formulated to present a colorless state by drying or other means after printing.

In preparing a color-changing agent into a color-changing ink, a solvent for a color changing agent such as alcohols is used, and polyhydric alcohols, surface active agents, various types of resins or the like are also added. In the case that colors are developed by using a color former such as water or alcohols after printing, it is preferable to use a wter-soluble color-changing ink vehicle as a color-changing ink. As additives for forming water-soluble color-changing ink vehicles, dimethyl-sulfonamide, dimethylsulfoxide, alcohols, polyhydric alcohols can be used, and as a thickening agent, rosin, shellac, guaiac gum, methylcellulose, ethylcellulose can be used.

Color developing inks can be arranged by either mixing and kneading color-changing agents ground into fine grains with different types of ink vehicles, or by mixing and kneading color-changing agents after being dissolved in solutions and adhered to proper inorganic or organic powder with different types of ink vehicles.

In Table 1 combination examples of color-changing agents and color formers which can be used for prints of the invention, pH values at which the color-changing agents develop colors, i.e. color developing pH, pH values at which they discolor, i.e. discoloring pH, and kinds of colors are shown. The color developing pH is a value at which a printed portion turns the color density to become easily identifiable or legible to human eyes. The discoloring pH is a value at which it becomes in a discolored state so that it can be rarely sensed by normal naked eyes, and color changing and discoloring ranges can be selected at will between the two values. The time required to turn from discolored to colored state can be controlled by such as quantity of pH regulator in color-changing agent and type of additive material. In color changing ink, 75 parts of denaturated alcohol, 15 parts of water, 10 parts of surface active agent and 0 to 10 parts of tartaric acid can be contained as its vehicle composition.

Thus, in the first and the second color-changing agents, by using the same series of agent and changing their pH values, the first color-changing agent maintains the color-change and the second color-changing agent returns to colorlessness after the color-change by applying the color former regulated at a single pH value.

As for applicators used to make color formers act on such prints, there are pen type applicators such as marker pens having acrylic or polyethylene tips on the leading ends as well as so-called felt-tip pens. A container having a spongy applicator part at the leading end, a sprayer and a container containing a color former with a small brush, rubber or sponge roller used to apply the agent can also form an applicator of the invention. In the case that checking marks are drawn with an applicator, those for drawing thinner lines such as felt-tip pens are preferable.

Thus, as shown in FIG. 2a, while reading the question column 11, the answer column 12 is filled with the answers by marking o or x with an applicator containing the color former. Since the answer column 12 is the discoloring area 3, by applying the color former, the second color-changing agent changes to a visible color, and the marks written by the answered and demonstrated.

Moreover, as shown in FIG. 2b, by applying the same color former as used in filling the answer column 12 with the writing material containing the color former onto the entire surface of the correct answer column 13 of the sheet of paper, in the correct answer column 13 where the marks o and x are priorly printed in invisible colorlessness, the second color-changing agent changes to visible colors by the application.

Therefore, the answered can compare the answer column 12 with the correct answer column 13. In items where the answer column 12 and the correct answer column 13 are different, that is misanswered items, by applying the color former with the applicator onto the judgment column 14, the color former reacts to the first color-changing agent to change to a visible color as shown in FIG. 3.

As the answer column 12 and the correct answer column 13 are printed with the ink containing the second color-changing agent, within an hour, preferably in a few minutes after is has changed to a visible color, it returns to a colorless state. On the other hand, the judgment column 14 is printed by using the first color-changing agent, and therefore it retains the visible color-change for twenty-four hours or a longer period. Thus, as shown in FIG. 4, by the color-change of the judgment column 14, portions to be learned again come to be evidently distinguished, and by using the answer column 12 and correct answer column 13, the learner can answer them again and compare the answers with the correct answers.

It is also possible to form the color-forming areas and the discoloring areas on the premise that the first color-changing agent and the second color-changing agent are used in different compositions, and the color formers corresponding to the first color-changing agent and the second color-changing agent are distinguished in application.

Moreover, as shown in FIG. 1, it is also possible to deposit a seal 15 on which a color former P in dried state is preliminarily applied and to develop a visible color by dissolving the color former P by using a painting brush containing city water and applying it onto the color-forming area and discoloring area. As the color former P, slightly alkaline compound such as sodium carbonate is safer and can be employed preferably.

As described hereinbefore, since a print of the invention comprises color-changing areas which continuously changes colors from colorlessness to visible colors by an application of the color former and discoloring areas which returns to colorless state by an application of the color former, in the case of utilizing for an educational sheet, such print allows learning in repetition and effective use of the print.

As color-forming areas and discoloring areas are both present in a print, in the educational sheet, portions required to be learned in repetition can be evidently distinguished and separated, which further improves the educational efficiency. In addition, as it changes to a visible color by a reaction between the color former and color-changing agents, the operation can be performed safely without need of heating source.

A print of the invention can be used in many applications by forming outlines of a picture as color-forming area and colored portions as discoloring areas in a picture book for children to form a reusable picture book by making children expect the appearance of pictures and showing colors in repetition.

the paper separate from said first color-forming area by using an ink containing a second color-changing agent which changes from substantially invisible colorlessness to visibleness by applying said color former and fades to a colorless state quickly whereas said first color-forming area fades to a colorless state slowly.

2. The reusable hidden indicia printed sheet of claim 1, further including a pH regulating agent.

3. The print of claim 2, wherein the pH regulating agent is present in the ink.

4. The print of claim 2, wherein the pH regulating agent is present in the color former.

5. A reusable hidden indicia printed sheet according to claim 1, wherein said pH indicator is selected from the group consisting of $\gamma$-dinitrophenol, m-nitrophenol, o-nitrophenol, p-nitrophenol, cyanine, $\alpha$-naphtholphthalein, phenolphthalein, cresolphthalein, thymolphthalein, ethylbis-acetic acid, bromphenol purple, hex-

TABLE 1

| Color changing agent | Content/100 g | Color developing pH | Color fading pH | Color | Color former combined |
| --- | --- | --- | --- | --- | --- |
| $\gamma$-Dinitrophenol | 3 g | 5.8 | 4.0 | Yellow | Amines (liquid) |
| p-Nitrophenol | 3 g | 7.6 | 5.6 | Yellow | Amines (liquid), amine vapor, ammonia (liquid, vapor) |
| m-Nitrophenol | 3 g | 8.4 | 5.5 | Yellow | Amines (liquid, vapor) ammonia (liquid, vapor) |
| Cyanine | 4 g | 8.6 | 4.0 | Blue | Amines (liquid, vapor) |
| $\alpha$-Naphthol phthalein | 2 g | 9.2 | 5.8 | Blue | Amines (liquid, vapor) ammonia (liquid, vapor) |
| Ethyl bis-acetic acid | 7 g | 10.5 | 7.5 | Blue | Amines (liquid) ammonia (liquid) NaOH, KOH |
| Phenol phthalein | 7 g | 10.2 | 7.5 | Reddish purple | Amines (liquid) ammonia (liquid) NaOH, KOH |
| Cresol phthalein | 5 g | 10.5 | 7.4 | Scarlet | Amines (liquid) ammonia (liquid) NaOH, KOH |
| Thymol phthalein | 6 g | 11.6 | 8.6 | Blue | ammonia (liquid) NaOH, KOH |
| Bromphenol purple | 5 g | 12.2 | 7.5 | purple | ammonia (liquid) NaOH, KOH |
| Hexamethoxy red | 2 g | 2.6 | 5.0 | Reddish purple | Nitric acid |
| Heptomethoxy red | 2 g | 4.7 | 7.5 | Red | Acetic acid |

I claim:

1. A reusable hidden indicia printed sheet comprising a paper containing a first color-forming area printed thereon by using an ink containing a first color-changing agent which changes from substantially invisible colorlessness to visibleness by applying a color former, wherein said color former comprises a solution pH indicator and a second color-forming area printed upon amethoxy red, heptamethoxy red and mixtures thereof.

6. A print according to claim 2, wherein said pH regulator is selected from the group consisting of ammonia, monoethanolamine, 3-ethoxypropylamine, diisobutylamine, secbutylamine, isopropanolamine, ethanolamine, 2-ethylhexylamine, ethyleneamine, acetic acid and formic acid.

* * * * *